United States Patent [19]

Anderson

[11] 4,416,568
[45] Nov. 22, 1983

[54] TWIN OUTLET FEED DISTRIBUTOR

[76] Inventor: Raymond L. Anderson, P.O. Box 219, Faro, Yukon, Canada, K0B 1K0

[21] Appl. No.: 352,402

[22] Filed: Feb. 25, 1982

[51] Int. Cl.³ .............................................. B65G 53/30
[52] U.S. Cl. .................................... 406/123; 406/126; 406/133
[58] Field of Search ............... 406/102, 104, 119, 123, 406/124, 125, 126, 132, 133

[56] References Cited

FOREIGN PATENT DOCUMENTS 697706 11/1964 Canada ................................. 406/126

Primary Examiner—Jeffrey V. Nase

Attorney, Agent, or Firm—Lawrence I. Field

[57] ABSTRACT

A twin outlet feed distributor for collecting ores and slurries and distributing them for further handling and distribution consisting of a single upper chamber, at least two lower chambers immediately below the upper chamber, a valve between the upper chamber, and each of the lower chambers, a pump associated with each of the lower chambers for removing ore and slurry from the lower chambers, a vent pipe from each of the lower chambers, the upper end of each of the vent pipes being directed into the upper chamber, and a high pressure water inlet into each lower chamber for flushing slurry and ore selectively from the lower chambers through the vent pipe into the upper chamber.

3 Claims, 3 Drawing Figures

TWIN OUTLET FEED DISTRIBUTOR

SUMMARY OF INVENTION

This invention relates to a twin outlet feed distributor which is used as a common collecting point for ore and slurry collected from a mining operation. After collection, the ore and slurry are transmitted for further handling and distribution.

BACKGROUND OF INVENTION

Various types of ore and slurry distributors are known, each of these types having a flushing system to prevent the blocking of the distributor by sludge accumlation. Some prior art distributors also have a baffle system so that when the flushing water is injected into the distributor, the level of water rises in one compartment and runs over an enclosed baffle producing a syphoning action to dislodge the sludge and hopefully clean out the unit. Such a system however is liable to dilute the slurry to such a degree that it has unsuitable physical properties and is difficult to handle or further process. It is also known to have a two pump arrangement in an ore and slurry distributor, with passages being so arranged that the operation of one pump tends to clear the buildup around the other pump and vice versa, so that periodic running of the pumps should keep the distributor clear of sludge buildup.

BRIEF DESCRIPTION OF INVENTION

In the distributor of this invention, there is one common upper chamber, into which the ore and sludge are deposited, and two separate lower chambers, each lower chamber being connected to the upper chamber through a closing device, and each being connected to its own pump and having its own flushing system and vent. With this distributor, it is possible to run both pumps at once or one pump alone while the other pump is being repaired or while the lower chamber associated with the other pump is being unplugged or cleaned out.

BRIEF DESCRIPTION OF DRAWINGS

This invention will now be described with reference to the accompanying drawings in which.

DETAILED DESCRIPTION OF INVENTION

Figure 1:
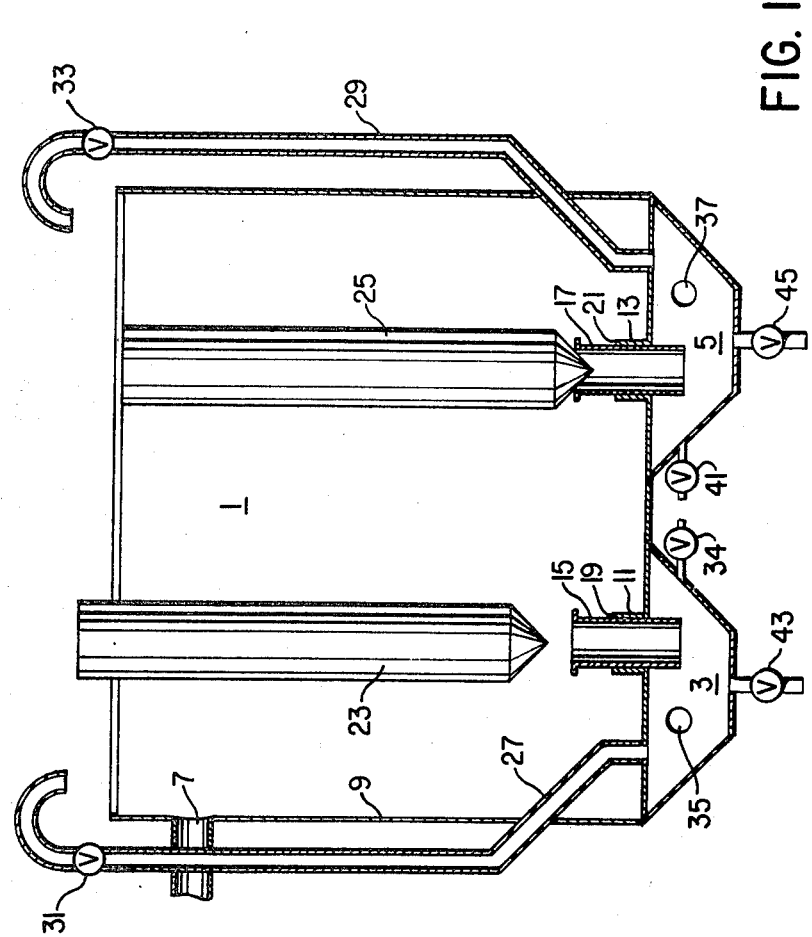
FIG. 1 is a diagrammatic front view of the ore and slurry distributor of this invention.

The ore and slurry distributor as shown in FIG. 1 consists of an upper chamber 1 and two lower chambers 3 and 5. An ore and slurry overflow 7 is situated in one of the vertical walls 9 of the upper chamber 1, or is situated in any other place which will be convenient for draining ore and slurry from the upper chamber 1 when necessary.

Between the upper chamber 1 and lower chambers 3 and 5 are raised openings 11 and 13, respectively, into which are secured extended valve seats 15 and 17, respectively. These valve seats 15 and 17 can be secured by bolted flanges 19 and 21, respectively, or the like, so as to be easily replaceable when wear occurs. Cooperating with the valve seats 15 and 17 are valves 23 and 25, respectively, which are shown in diagrammatic form and can be any type of closing device operating electrically, pneumatically, hydraulically or mechanically by a operator or by an automatic system.

Each lower chamber 3 and 5 has a vent pipe 27 and 29, respectively, which is directed up and over into the top of upper chamber 1, each pipe having a stop valve 31 and 33, respectively. Each lower chamber 3 and 5 has an outlet 35 and 37 to two separate pumps, a high pressure valve water supply 34 and 41, respectively, and drains 43 and 45, respectively.

Figure 3:
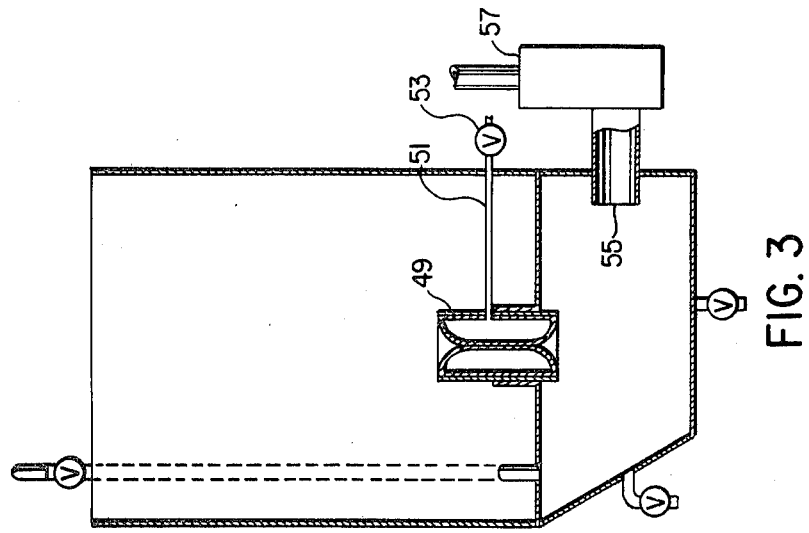
FIG. 3 is a diagrammatic side elevational view of the distributor of FIG. 2.
Figure 2:
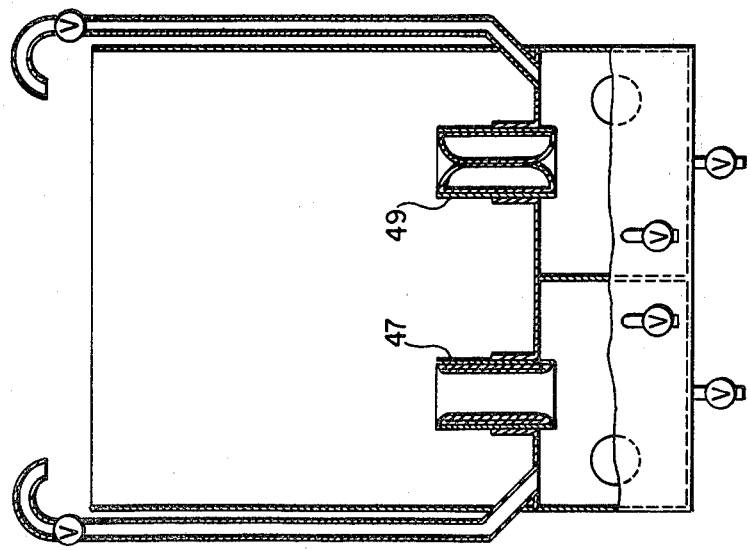
FIG. 2 is a diagrammatic front view of another embodiment of the distributor of this invention.

Referring to FIGS. 2 and 3, this embodiment of the distributor is basically the same as the embodiment of FIG. 1 except that the shape of the lower chambers is different to those shown in FIG. 1 and a specific form of pneumatic valve is shown. The pneumatic valves 47 and 49 are each in the form of a toroid of resilient tough plastics, such as that known by the trade mark NEOPRENE. The operation of the valves can be such as through a compressed air inlet 51 controlled by a valve 53. The outlet of the lower chambers, one of which is shown in FIG. 3 and identified by reference numeral 55, leads directly to a pump 57.

The operation of the distributor will now be explained with reference mainly to FIG. 1.

During normal pumping operations, either one of the pumps will be used. The ore and slurry enters chamber 1 from above, the ore falling to the bottom of the chamber onto a bed of ore and slurry which forms to the height of the valve seats 15 and 17. This bed of ore and slurry reduces damage to the bottom of chamber 1 which could occur if the ore and slurry were permitted to drop and impinge directly on the bottom of chamber 1. Assuming that ore and slurry is being pumped from outlet 37, if the buildup of slurry in lower chamber 5 is sufficient to block the outlet 37 to the pump, the valve 25 will then be closed as shown in FIG. 1 and the pump utilizing outlet 35 in lower chamber 3 will be started, so continuing the distribution of ore and slurry via chamber 3. High pressure water will then be forced through supply 41 into lower chamber 5 and will force slurry and ore up pipe 29 to be deposited again into upper chamber 1. The pump from outlet 37 can then be re-started and hopefully will again begin pumping. If pumping still does not occur, valve 33 in pipe 39 can be closed and the high pressure water entering from supply 41 can be forced directly through outlet 37 into the pump, so cleaning out any slurry accumulated between outlet 37 and the pump. Valve 33 will then be opened, the high pressure water will be shut-off, the pump from outlet 37 started, and the valve 25 opened. If required, valve 23 can then be closed and the pump from outlet 35 can be stopped. Pipes 27 and 29 also function as vent pipes to vent off any air or gases which are released from the ore and slurry mixture in lower chambers 3 and 5, respectively. The release of such gases ensures that they are not drawn into the pumps in any great quantity, so reducing cavitation and increasing the pump life.

This distributor is also arranged such that it can be operated automatically, a lack of flow from one pump automatically shutting down that pump, starting the other pump and opening and closing the various valves until the obstruction is cleared.

It is also possible to operate the distributor on one pump while the other pump is being repaired, at each lower chamber can be completely closed off from the ore and slurry mixture while the other lower chamber is still handling the distribution of the mixture.

Furthermore, the valve seats 15, 17 and outlets 35, 37 can also be made of similar wear resistant material and be of a similar shape to make them easily interchangeably replaceable.

It will therefore be appreciated that the distributor of this invention has many advantages over known distributors in that it will seldom be necessary to completely shut-down the distributor for overhaul as most parts of the distributor can be serviced by selectively shutting down only one of the lower chambers. The capabilities of adaptation of the system to automatic control are also of great advantage to the user.

I claim:

1. A twin outlet feed distributor for collecting ores and slurries and distributing them for further handling and distribution consisting of a single upper chamber, at least two lower chambers immediately below said upper chamber, a valve between said upper chamber and each of said lower chambers, a pump associated with each of said lower chambers for removing ore and slurry from said lower chambers, a vent pipe from each of said lower chambers, the upper end of each of said vent pipes being directed into said upper chamber, and a high pressure water inlet into each lower chamber for flushing slurry and ore selectively from said lower chambers through said vent pipe into said upper chamber.

2. The distributor of claim 1, wherein each of said valves is arranged to cooperate with a valve seat which is made of wear resistant material and is replaceable.

3. The distributor of claim 1 or 2, wherein each of said valves is arranged so as to be above the bottom of the upper chamber so that, during use, a bead of ore and slurry is formed upon the bottom of the upper chamber.

* * * * *